United States Patent

Bellanger et al.

[15] 3,674,937

[45] July 4, 1972

[54] TRANSMISSION DEVICE FOR THE TRANSMISSION OF ANALOG SIGNALS BY MEANS OF PULSE CODE MODULATION

[72] Inventors: Maurice Georges Bellanger, Antony; Jacques Lucien Daguet, St. Maur; Tuan Kiet Duong, Velizy, all of France

[73] Assignee: S.A. Telecommunications Radioelectriques et Telephoniques T.R.T., Paris, France

[22] Filed: Feb. 2, 1970

[21] Appl. No.: 7,635

[52] U.S. Cl. ..............................179/15 A, 325/38, 332/9 R, 328/112

[51] Int. Cl. ..............................H04j 3/04

[58] Field of Search ..............179/15 AP, 15 Aw; 325/38, 44, 325/142, 143; 332/9 R, 9 T; 328/112, 114

[56] References Cited

UNITED STATES PATENTS 3,277,395 10/1966 Grindle ..............................332/9 T

*Primary Examiner*—Ralph D. Blakeslee

*Attorney*—Frank R. Trifari

[57] ABSTRACT

A transmission device for the transmission of analog signals by means of pulse code modulation, particularly in time-division multiplex systems wherein for the purpose of generating the PCM signals the analog signals are applied through a duration modulating device to a counter controlled by clock pulses.

In order to reduce the counting speed and the dynamic range of the comparator the duration modulating device is provided with two integrating networks having mutually greatly different time constants for pulse-duration modulation in accordance with four different slopes, each integrating network being connected to a counter controlled by clock pulses which counters provide the pulses of the greatest weight and of the smallest weight, respectively, of the code group characterized by the analog signal.

6 Claims, 11 Drawing Figures

Figures 1, 2:
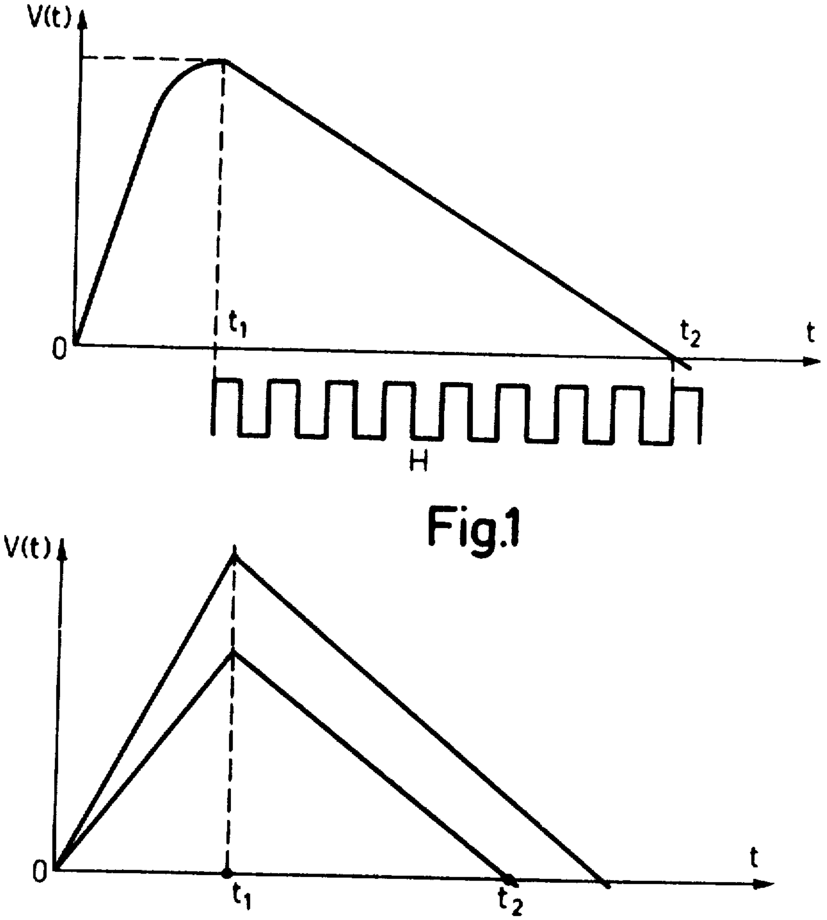

INVENTORS
MAURICE G. BELLANGER
JACQUES L. DAGUET
BY TUAN K. DUONG

Frank R. Trifari

AGENT

INVENTORS
MAURICE G. BELLANGER
JACQUES L. DAGUET
BY TUAN K. DUONG
Frank R. Trifari
AGENT

INVENTORS
MAURICE G. BELLANGER
JACQUES L. DAGUET
BY TUAN K. DUONG

Frank R. Trifari
AGENT

INVENTORS
MAURICE G. BELLANGER
JACQUES L. DAGUET
BY TUAN K. DUONG
AGENT

INVENTORS
MAURICE G. BELLANGER
JACQUES L. DAGUET
TUAN K. DUONG
BY
AGENT

INVENTORS
MAURICE G. BELLANGER
JACQUES L. DAGUET
BY TUAN K. DUONG
AGENT

INVENTORS
MAURICE G. BELLANGER
JACQUES L. DAGUET
BY TUAN K. DUONG
[signature]
AGENT

TRANSMISSION DEVICE FOR THE TRANSMISSION OF ANALOG SIGNALS BY MEANS OF PULSE CODE MODULATION

The present invention relates to a transmission device for the transmission of analog signals by means of pulse code modulation wherein for the purpose of generating the PCM signals the analog signals are applied through a duration modulating device to a counter controlled by clock pulses. Furthermore, the invention relates to a transmission device wherein the PCM signals are applied to a counter for recovering the analog signals. Such transmission devices are particularly used in time-division multiplex systems (TDM systems).

The following operations are performed in transmission devices of the kind described hereinbefore:

Sampling of the signal to be converted

Conversion of the amplitude-modulated samples to duration-modulated pulses

Measurement of the duration-modulated pulses with the aid of clock signals.

The possibility of carrying such an amplitude-to-duration conversion into effect by means of a circuit employing one slope is already known. In a circuit employing one slope, for example, a capacitor is charged until the voltage at its terminals has reached the amplitude of the sample to be converted whereafter the capacitor is subsequently discharged at a constant current.

Such a circuit has the following drawbacks:

1. Great sensitivity to noise, particularly at the beginning of the discharge at constant current, 2. A great sensitivity to variations in the capacitance as a function of temperature and time and to variations in the discharge current (these phenomena result in a variation of the slope and consequently a shift of the mean value of the signals to be converted, and counting errors), 3. A high clock frequency is required if the duration is to be measured with great precision; for example, for a conversion performed every 125 $\mu$S, (sampling frequency 8 kHz) an accuracy of $1:2^{12}=1:4096$ requires a clock frequency of 32 MHz, 4. The slope is limited by the maximum admissible voltage at the input of the comparator, which imposes strict requirements to this comparator so as to be able to sufficiently precisely determine the instant when the voltage at the capacitor terminals exceeds the reference threshold at the end of the counting operation; if, in addition, the slope is weak there is the risk of the comparators starting, to act on parasitic signals when its useful input signals obtain a value of the same order.

To eliminate the two first-mentioned drawbacks, to wit the sensitivity to noise and the sensitivity to variations in the capacitance as a function of temperature and time and to variations in the discharge current, it is possible to use an amplitude-to-duration conversion employing two slopes. In such a circuit employing two slopes a capacitor is charged at a constant current which is proportional to the voltage to be converted during a fixed time interval at the end of which the capacitor voltage is proportional to the voltage to be converted. The capacitor is subsequently discharged at a constant current. The first drawback is then eliminated, for the noise is integrated; on the other hand it can be shown that the measured duration is then independent of the time constant of the integrator if the same time constant is used for charging and discharging so that the second drawback is eliminated.

To evade the third drawback, to wit a high clock frequency, it is possible to use an amplitude-to-duration converter employing three slopes in order to decrease the counting frequency; in this case two counters are required, one for the coarse measurement and the other for a fine measurement. The constant discharge current is divided by a fixed number when the capacitor voltage has dropped below a given reference value $E_o$ and when also the leading edge of the next clock pulse occurs which causes the first counter to step forward. The slope has then become smaller and the second counter starts to work at the same clock frequency as does the first. To attain, for example, a precision of $1:2^{12}=1:4096$ it is possible to use two counters each having six stages, the ratio between the slope of the first and the second counter then is $2^6:1$. An amplitude-to-duration conversion will then be performed every 125 $\mu$S at a clock frequency which for the sake of the fixed time interval associated with the first slope is slightly higher than $2\times 32/2^6$ MHz $=1$ MHz.

It is an object of the present invention to provide a device which makes it possible to obviate the aforementioned fourth drawback, to wit the limitation of the slope by the maximum admissible input voltage of the comparator (which limits the accuracy of determining the instant when the capacitor voltage exceeds the reference threshold at the end of the counting operation) and to lessen the risk of the comparator starting to act on parasitic signals when its input signals obtain values of the same order.

The transmission device according to the invention is characterized in that the pulse-duration modulating device is provided with two integrating networks having mutually greatly different time constants for pulse-duration modulation in accordance with four different slopes, each integrating network being connected to a counter controlled by clock pulses which counters provide the pulses of the greatest weight and of the smallest weight, respectively, of the code group characterized by the analog signal.

In a practical embodiment of the transmission device according to the invention, the capacitor of the first integrating network is charged during a fixed time interval at a constant current which is proportional to the voltage to be converted, whereafter this capacitor is discharged at a constant current, the first counting operation of the clock pulses taking place during this discharge. When the capacitor voltage has dropped below a reference value $E_o$, a bistable comparator carries out the following two operations when the leading edge of the next clock pulse occurs:

1. Stopping the discharge of the capacitor in the first integrating network, thus maintaining the residual voltage at the value which it had at the instant of the leading edge of the clock pulse, 2. Charging the capacitor of the second integrating network at a constant current which is proportional to residual voltage during a fixed time interval; this capacitor is subsequently discharged at a constant current and the second counting is performed until the instant when the capacitor voltage exceeds the second reference threshold while simultaneously the output voltage of the first integrating network is brought and maintained at zero value until the end of the cycle.

The reference value $E_o$ is higher than a quantization step. If the residual voltage to be converted is too high and exceeds the capacity of the second counter, this second counter causes the first counter to advance by one step.

The voltage to be converted may be a very narrow, suitably amplified signal sample. For considerations of economy and simplicity of construction, the signal itself is preferably applied to the circuit during the first integration interval. This manner of operation causes a slight linear signal distortion which, however, can be corrected in a simple manner.

Figure 3:
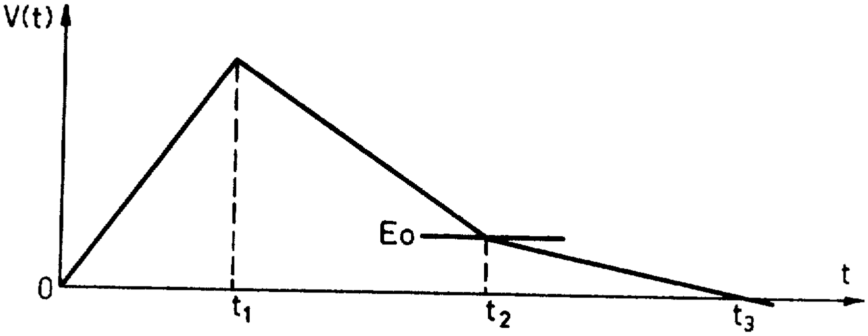

In order that the invention may be readily carried into effect, a few embodiments thereof will now be described in detail, by way of example, with reference to the accompanying diagrammatic drawings, in which:

FIG. 1 shows the amplitude-to-duration conversion for a circuit employing one slope, while FIG. 2 shows the amplitude-to-duration conversion for a circuit employing two slopes and FIG. 3 shows the amplitude-to-duration conversion for a circuit employing three slopes.

Figure 4A:
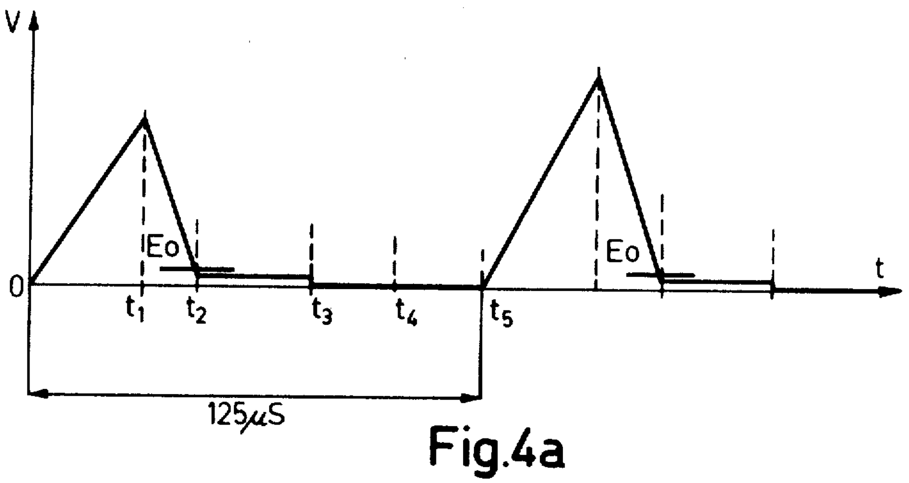
Figure 4B:
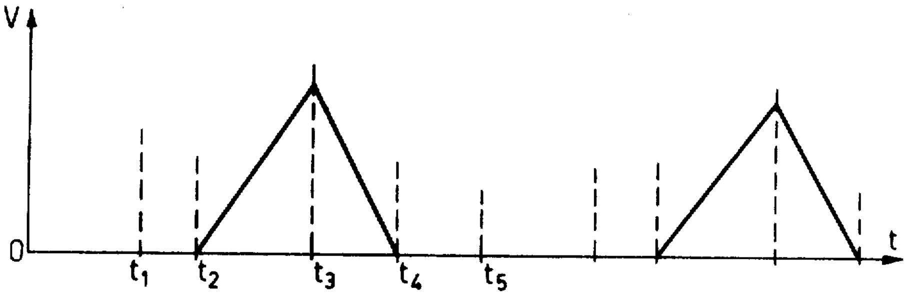
Figure 5:
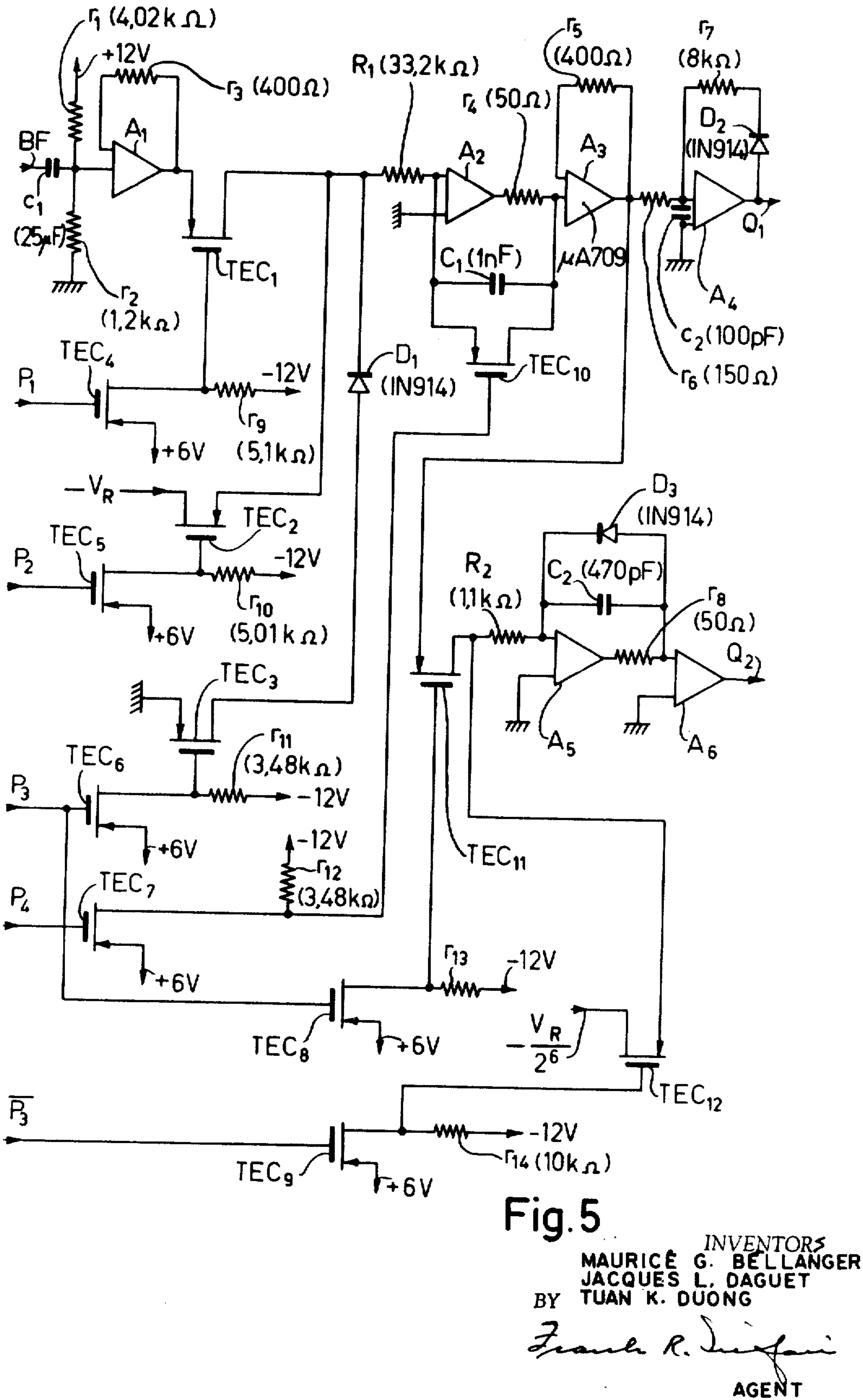
Figure 6:
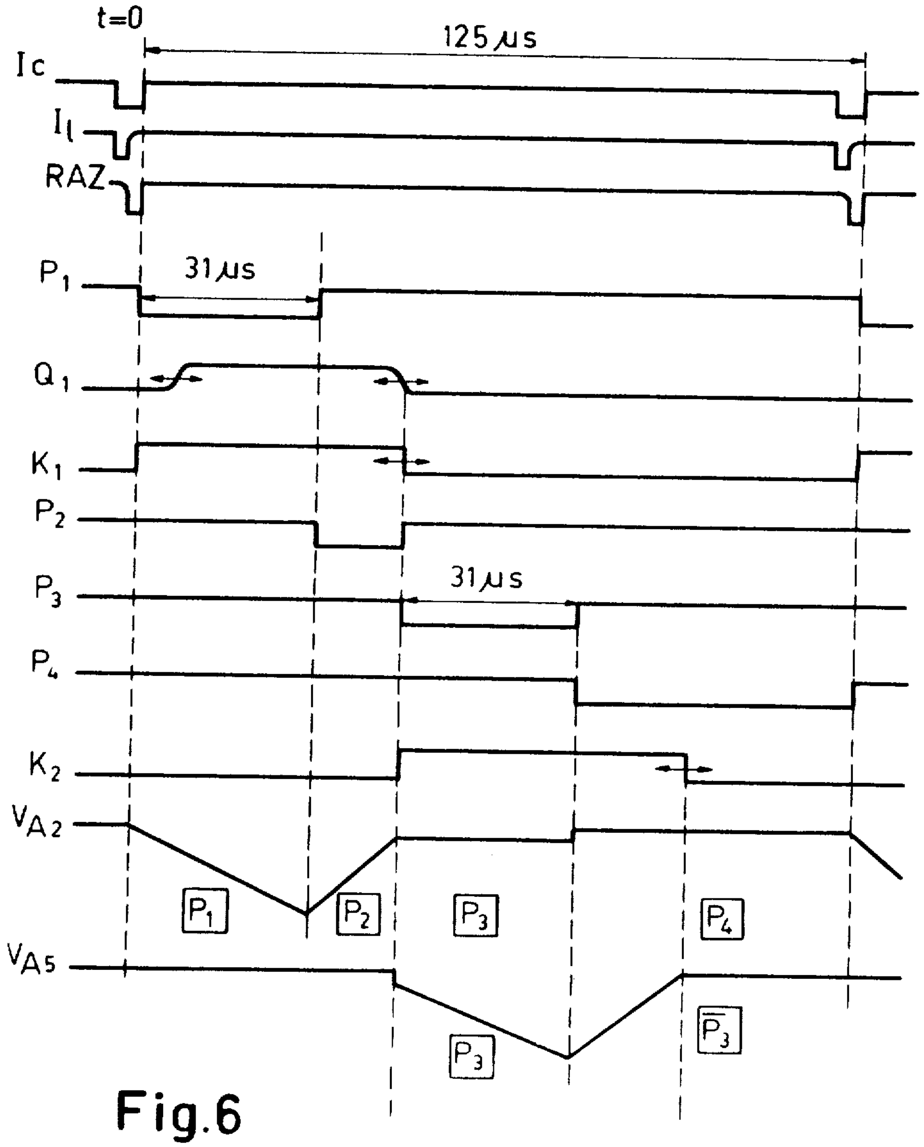
Figure 7:
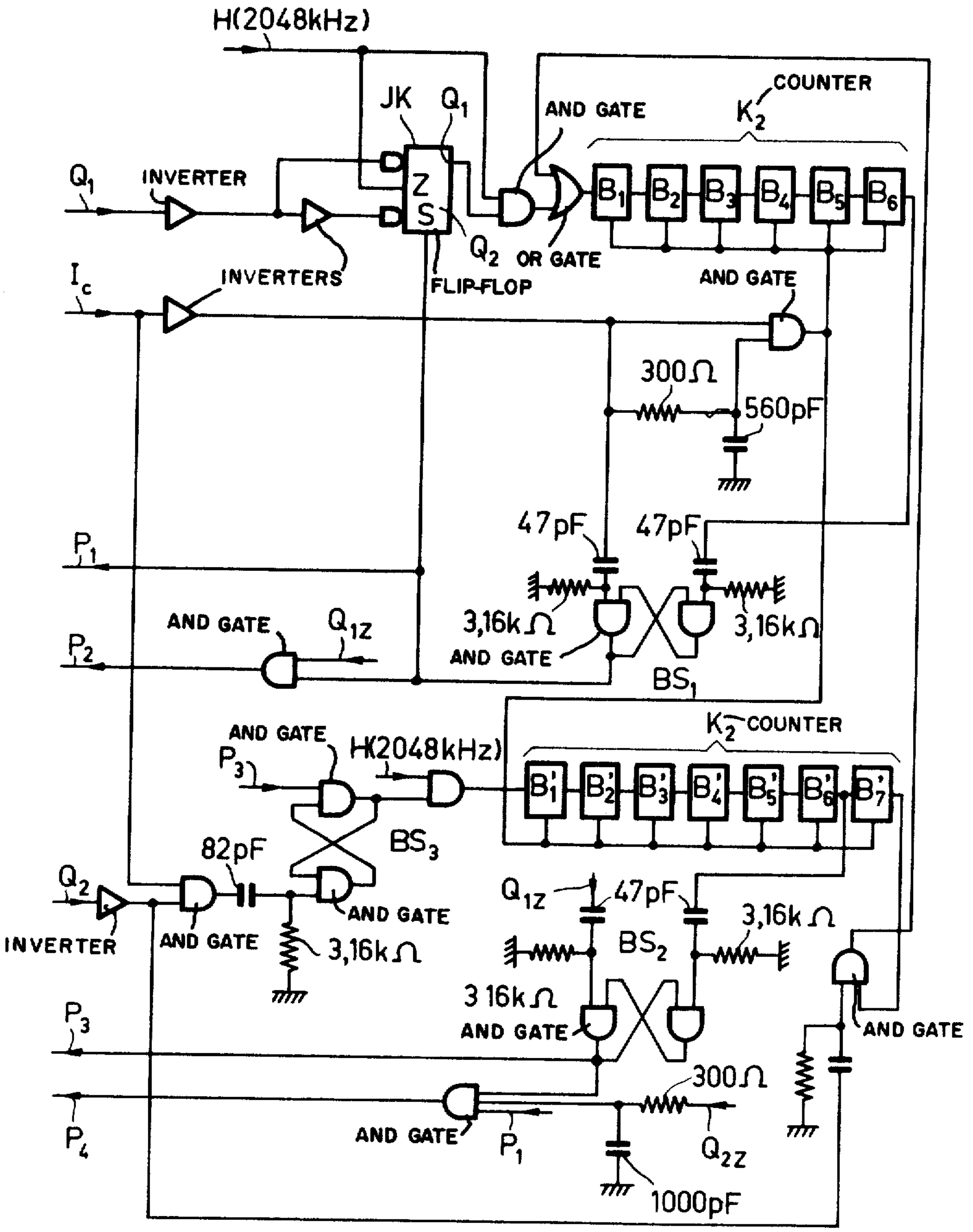
Figures 8, 10:
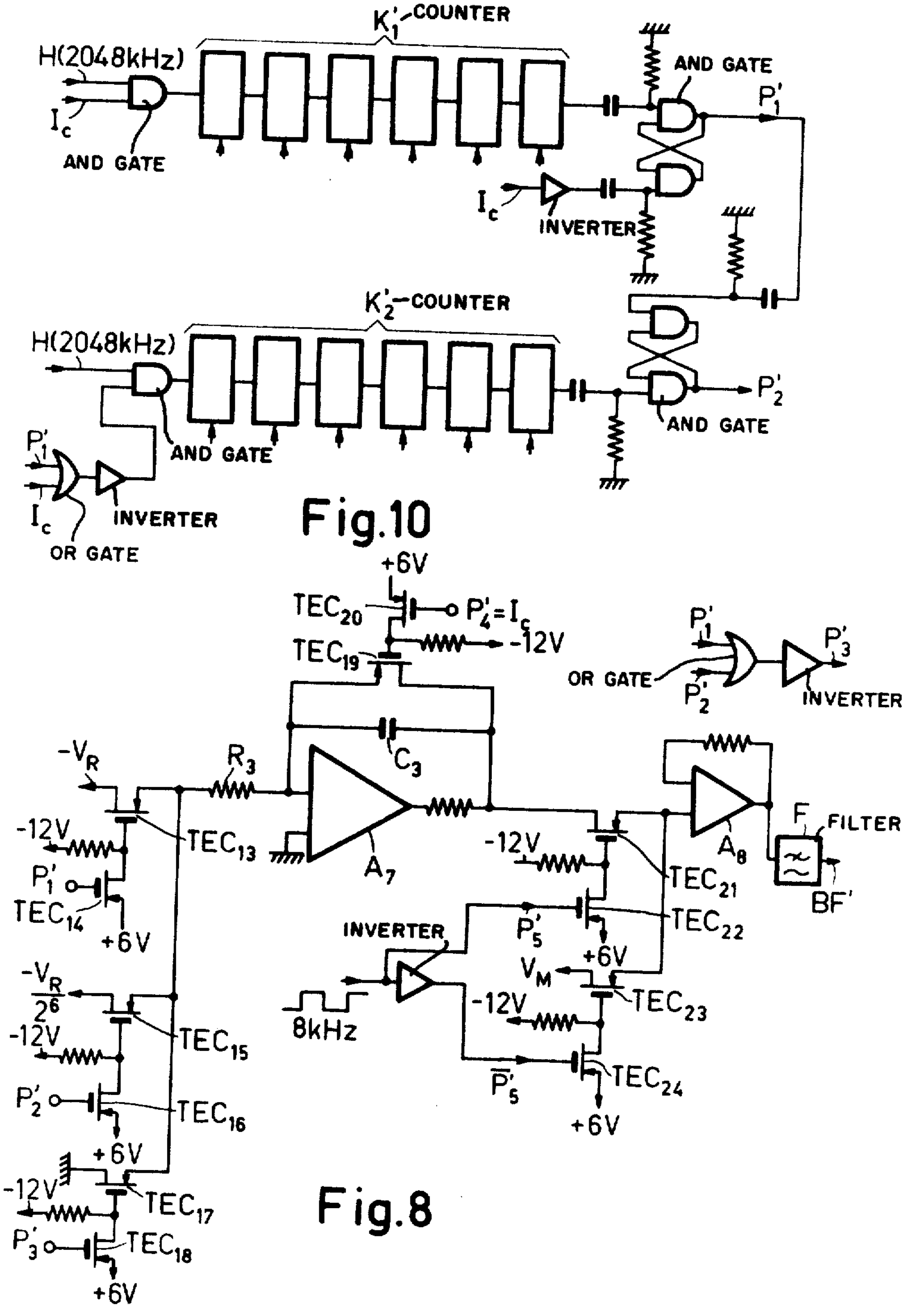
Figure 9:
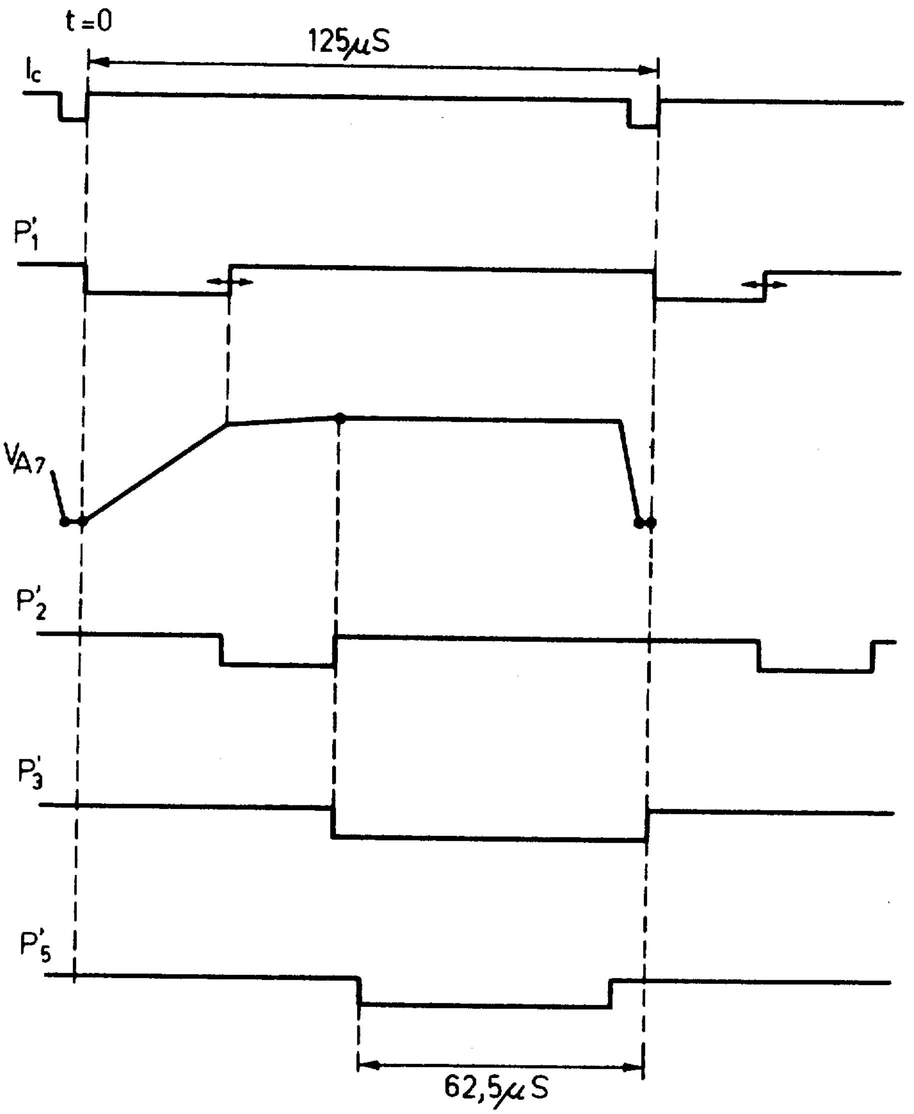

FIG. 4*a* shows as a function of time the voltage at the terminals of the first integrating network and FIG. 4*b* shows as a function of time the voltage at the terminals of the second integrating network in a transmission device according to the invention, FIG. 5 shows the diagram of the analog part of a transmission device according to the invention, and FIG. 6 shows the associated time diagrams, FIG. 7 shows the diagram of the digital part of a transmission device according to the invention, FIG. 8 diagrammatically shows the transmission device for recovering the analog signals and FIG. 9 shows the associated time diagram while FIG. 10 shows the diagram of the digital part of the transmission device according to FIG. 8.

The time diagram of FIG. 1 shows the variation of the voltage at the terminals of a capacitor when this capacitor is charged between 0 and $t_1$ until this voltage has reached the amplitude of the voltage to be converted. This capacitor is discharged at a constant current between $t_1$ and $t_2$ and the clock pulses H are counted simultaneously. The drawbacks of such a circuit employing one slope have already been stated.

The time diagram of FIG. 2 shows the variation of the capacitor voltage for a circuit employing two slopes. The capacitor is charged during a fixed time interval $(o, t_1)$ at a constant current which is proportional to the voltage to be converted and at the end of this time interval the capacitor voltage is proportional to the voltage to be converted, whereafter the capacitor is discharged at a constant current and during this time interval $(t_1, t_2)$ the clock pulses are counted.

The time diagram of FIG. 3 shows the variation of the capacitor voltage for a circuit employing three slopes. The capacitor is charged during a fixed time interval $(o, t_1)$ at a constant current which is proportional to the voltage to be converted. The discharge current is divided by a fixed number when the capacitor voltage has dropped below a given reference value $E_o$ at the instant $t_2$ and when the leading edge of the clock pulse occurs which causes the counter to go forward. The slope has then become smaller. Two counters are used, one for a coarse measurement (performed between $t_1$ and $t_2$) the other for a fine measurement (performed between $t_2$ and $t_3$).

The transmission device according to the invention makes it possible to obviate all the aforementioned drawbacks. The time diagram of FIG. 4*a* shows the variation of the output voltage of the first integrating network. During a fixed time interval $(0, t_1)$, the capacitor of the first integrator is charged at a constant current which is proportional to the voltage to be converted; subsequently this capacitor is discharged at a constant current (between $t_1$ and $t_2$) while also the first counting is performed. When this capacitor voltage drops below a reference voltage $E_o$ a bistable comparator causes the discharge to stop when the leading edge of the next clock pulse occurs and maintains the capacitor voltage until the instant $t_3$ at the value which it had at the instant $t_2$. During the time interval $(t_3, t_5)$ wherein $t_5$ corresponds to the end of the cycle of 125 $\mu$S for a sampling frequency of 8 kHz, the output voltage of the first integrator is brought to and maintained at zero.

The time diagram of FIG. 4*b* shows the variation of the output voltage of the second integrating network. During a fixed time interval $(t_2, t_3)$ the capacitor of the second integrating network is charged under the control of the aforementioned comparator at a constant current which is proportional to the residual voltage $V(t_2)$ of the first integrating network. This capacitor is subsequently discharged at a constant current and during the time interval $(t_3, t_4)$ the second counting is performed until the instant $t_4$ when the capacitor voltage exceeds a second reference threshold.

FIG. 5 shows the diagram of the analog part of the transmission device according to the invention. The low-frequency analog signal BF to be converted is applied through a capacitor $c_1$ and a resistance bridge $r_1$, $r_2$ which determines the mean value of said signal (zero level) to an input terminal of an operational amplifier $A_1$ which is connected as a voltage follower (input impedance : several hundred k $\Omega$, output impedance: 200 $\Omega$). This amplifier $A_1$ is succeeded by the first integrating network which is formed by an operational amplifier $A_2$ and a circuit $R_1C_1$.$R_1$ is connected to various charge voltages of the integrator through field effect transistors $TEC_1$, $TEC_2$, $TEC_3$ (for example, of the MOS-type) which act as switches. The field-effect transistors $TEC_4$, $TEC_5$, $TEC_6$ which have outputs across $r_9$, $r_{10}$, and $r_{11}$ respectively act as control level adaptations (+6 Volt, −12 Volt) for the field effect transistors $TEC_1$, $TEC_2$, $TEC_3$.

A diode $D_1$ arranged between $R_1$ and $TEC_3$ makes it possible to obviate the occurrence of the drain-source current particularly during the time interval $(o, t_1)$.

The coding cycle is divided into four parts and the time intervals are determined by control signals $P_1$, $P_2$, $P_3$, $P_4$. During the fixed time interval $(o, t_1)$ the resistor $R_1$ is connected under the control of $P_1$ through $TEC_1$ to the signal to be converted. During the time interval $(t_1, t_2)$ of variable duration which corresponds to the first counting, $R_1$ is connected through $TEC_2$ controlled by $P_2$ to the reference voltage $-V_R$. $V_R$ is equal to the maximum value of the signal to be converted and has the opposite sign. The time interval $(t_1, t_2)$ terminates when the leading edge of the first clock pulse occurs which follows when the threshold $E_o$ is exceeded. During the time interval $(t_2, t_3)$ resistor $R_1$ is connected to ground through $TEC_3$ under the control of $P_3$. During the time interval $(t_3, t_5)$ the output voltage of the first integrator is brought and maintained at zero by $TEC_{10}$ which is connected parallel to capacitor $c_1$ under the control of $P_4$. The operational amplifier $A_2$ then acts as a voltage follower its input being connected to ground and the voltage zero being obtained with very great accuracy at its output.

Succeeding $A_2$ is an operational amplifier $A_3$ which is connected coupled through $r_4$ as a voltage follower and is provided with an RC network $r_6$, $c_2$ which makes it possible to eliminate unwanted signals and which constitutes the connection with the comparator which is formed by the operational amplifier $A_4$ and the reference input of which is connected to ground. Since in this case the reference voltage is zero, the residual voltage to be converted is negative. When the delay in the control of the integrator is taken into account, the amplitude of the residual voltage may be higher than a quantization step which results in the capacity of the second counter being exceeded. Since it is necessary to take the complement of the measurement obtained, the first counter is then caused to advance by one step under the control of the second counter. A circuit $r_7$, $D_2$ makes it possible to lock the comparator after its transition. The output of this comparator is connected to the digital part of the transmission device.

During the time interval $(t_2, t_3)$ the resistor $R_2$ of the second integrator (formed by the operational amplifier $A_5$ and the circuit $R_2C_2$) is connected to the output of the amplifier $A_3$, and due to a field effect transistor $TEC_{11}$ controlled by $P_3$ the capacitor $C_2$ is charged by a current which is proportional to the residual voltage to be converted.

Beyond the time interval $(t_2, t_3)$ $R_2$ is connected through $TEC_{12}$ (controlled by $\overline{P}_3$) to a reference voltage $-V_R/2^6$ which serves for discharging the second integrator at a constant current. A diode $D_3$ connects the output of the second integrator to one of its input terminals so as to prevent the output voltage from exceeding 0.7 Volt The output of the second integrator is connected through $r_8$ to the second comparator $A_6$ which terminates the second counting; the reference input of this comparator is connected to ground. It is to be noted that the field effect transistors $TEC_7$, $TEC_8$, $TEC_9$ which have outputs across $r_{12}$, $r_{13}$, and $r_{14}$ respectively function as control level adaptation transistors for $TEC_{10}$, $TEC_{11}$, $TEC_{12}$, respectively.

The digital part of the transmission device according to the invention will now be described with reference to FIGS. 6 and 7.

Starting from a channel control pulse $I_c$ (duration 1 $\mu$S, frequency 8 kHz) which is derived, for example, from the multiplex control circuit of a telecommunication system, the object of this digital part is to form the different control signals $P_1$, $P_2$, $P_3$, $P_4$ which are necessary for the analog part. $I_c$ makes it possible to read out the counters ($I_L$) and to return them to their zero state (RAZ).

The trailing edge of the channel control pulse $I_c$ marks the beginning of $P_1$; the clock signal H is then applied to the first counter $K_1$ which is provided with six bistable stages $B_1$–$B_6$; the end of the control pulse $P_1$ is brought about by the return of the counter to its zero state. The control pulse $P_1$ thus has a duration of $2^6$ clock periods and since the frequency of the clock signals is 2,048 kHz, $P_1$ lasts for approximately 31 $\mu$S.

The end of $P_1$ marks the beginning of $P_2$ at which the first counting starts; this counting terminates when both the first comparator $A_4$ has changed its state and the trailing edge of the next clock pulse occurs; the stages of the first counter retain their information until the next read-out pulse ($I_L$) occurs.

The end of $P_2$ marks the beginning of $P_3$ which activates the bistable trigger $BS_3$: the clock signal is then applied to the second counter $K_2$ which comprises six bistable stages $B'_1$–$B'_6$. The counter $K_2$ also includes a bistable stage $B'_7$ which upon exceeding the final state of the stages $B'_1$–$B'_6$ causes the first counter $K_1$ to advance by one step. The end of $P_3$ is brought about by the return of the counter $K_2$ to its initial state, whereafter the second counting begins which lasts until the second comparator $A_6$ changes its state. The control pulse $P_4$ starts at the end of $P_3$ and lasts until the end of the cycle.

The transmission device according to the invention will now be described with reference to FIGS. 8, 9 and 10 which device makes it possible to recover the original analog signal BF starting from the binary elements of each code group of the PCM signal.

During the channel control pulse $I_c$ the complement of the code group to be decoded is written in in the counters $K'_1$ and $K'_2$. The binary elements of the code group having the greatest weight are written in in the counter $K'_1$ and the binary elements of the code group having the smallest weight are written in in the counter $K'_2$. At the end of the channel control pulse $I_c$ the clock signal is applied to the first counter $K'_1$ and also the reference voltage $V_R$ is applied through $TEC_{13}$ controlled by $P'_2$ to the input of the integrator ($A_7$, $R_3$, $C_3$) for so long a period until the counter returns to its zero state. From that instant the clock signal is applied to the second counter $K'_2$ and also the voltage $-V_R/2^6$ is applied through $TEC_{15}$ to the input of the integrator for so long a period until the second counter returns to its zero state. From that instant up to the end of the cycle the input of the integrator is connected to ground. The output of the integrator then provides the recovered signal which is maintained during a time interval equal to or larger than half a cycle (62.5 $\mu$S).

During the channel control pulse $I_c$ the capacitor $C_3$ of the integrator is short-circuited with the aid of $TEC_{19}$ so that this integrator then acts as a voltage follower having an input connected to ground so that the voltage zero then occurs with great precision at the output.

The input of the operational amplifier $A_8$ which is connected as a voltage follower is connected to the output of the integrator during the second part of the cycle with the aid of $TEC_{21}$ which is controlled through $TEC_{22}$ by $P'_5$(clock signal of 8 kHz originating from the multiplex control circuit). During the first half of the cycle the said input of $A_8$ is connected to a voltage $V_M$, which represents the mean value of the recovered signal, with the aid of $TEC_{23}$ which is controlled through $TEC_{24}$ by $\overline{P'_5}$. A sampled signal having a duration of half a cycle is then available at the output of $A_8$; it is to be noted that this signal has a component of a frequency of 8 kHz which is the weaker the better the voltage $V_M$ represents the mean value of the recovered signal. The signal BF is obtained with the aid of a filter F.

Such transmission devices provide, inter alia, the following advantages in TDM systems:

1. A clock frequency of 2,048 kHz which is exactly equal to the pulse frequency in the transmission path in a 32-channel system having 8 binary elements per code group, wherein the same accuracy is maintained as in the case of a coding device provided with a circuit employing one slope using a clock frequency of 32384 kHz;

2. Such a clock frequency allows for a construction of the digital part with MOS-circuits, and since the analog part is already formed on the basis of MOS-circuits, the transmission devices may be integrated in a simple manner. It is even possible to incorporate in the transmission devices a compressor or expander built up from logic circuits which, for example, have a 13-segment characteristic and which themselves are formed with MOS circuits; the assembly may then be accommodated in a single housing, wherein 8 binary elements in series or parallel form are available for the line transmission under the control of the multiplex circuit.

Such a construction makes it possible to reduce the multiplex equipment to a considerable extent.

What is claimed is:

1. A transmission device for the transmission of analog signals by means of pulse code modulation wherein for the purpose of generating the PCM signals the analog signals are applied through a duration modulating device to a counter controlled by clock pulses, characterized in that the pulse-duration modulating device is provided with two integrating networks having mutually greatly different time constants for pulse-duration modulation in accordance with four different slopes, each integrating network being connected to a counter controlled by clock pulses which counters provide the pulses of the greatest weight and of the smallest weight, respectively, of the code group characterized by the analog signal.

2. A transmission device as claimed in claim 1, wherein the integrating networks each include an integration capacitor, characterized in that the integration capacitor of the first integrating network is charged during a fixed period of time at a constant current which is proportional to the signal value to be converted, which integration capacitor is subsequently discharged at a constant current, the counting taking place during this discharge period in the counter controlled by the clock pulses and being connected to the first integrating network until the voltage of the integration capacitor has dropped below a comparison voltage of a comparator which causes the discharge of the integration capacitor to stop upon the next clock pulse and retains the occurring residual voltage, whereafter the integration capacitor of the second integrating network having a greatly different time constant is charged at a constant current which is proportional to this residual voltage during a fixed period of time and is subsequently discharged at a constant current, the counting being performed by the counter connected to said second integrating network until the voltage of this integration capacitor drops below a threshold voltage, while at the beginning of said second discharge also the capacitor of the first integrating network is completely discharged and remains discharged until the next signal value to be converted occurs.

3. A transmission device as claimed in claim 2, characterized in that upon exceeding its final state the counter connected to the second integrating network causes the counter connected to the first integrating network to advance by one step.

4. A transmission device as claimed in claim 1, wherein a compressor built up from logic circuits is incorporated in the transmission device.

5. A transmission device as claimed in claim 1, wherein the PCM-signals for recovering the analog signals are applied to a counter, characterized in that the transmission device includes two counters, the complement of the pulses having the greatest weight being written in in the first counter and the complement of the pulses having the smallest weight being written in in the second counter, clock pulses being applied to the first counter and a first reference voltage being applied to the input of an integrating network until after termination of the counting process in the first counter clock pulses are applied to the second counter and the input of the integrating network is switched to a second reference voltage which is a fraction of the first-mentioned reference voltage until the second counter has terminated its counting process, the analog signal being derived from the output signal of the integrating network with the aid of an output filter.

6. A transmission device as claimed in claim 5, wherein an expander built up from logic circuits is incorporated in the transmission device.

* * * * *